May 9, 1939.  W. H. FRITZ  2,157,662
SHAFT CONSTRUCTION
Filed July 16, 1938
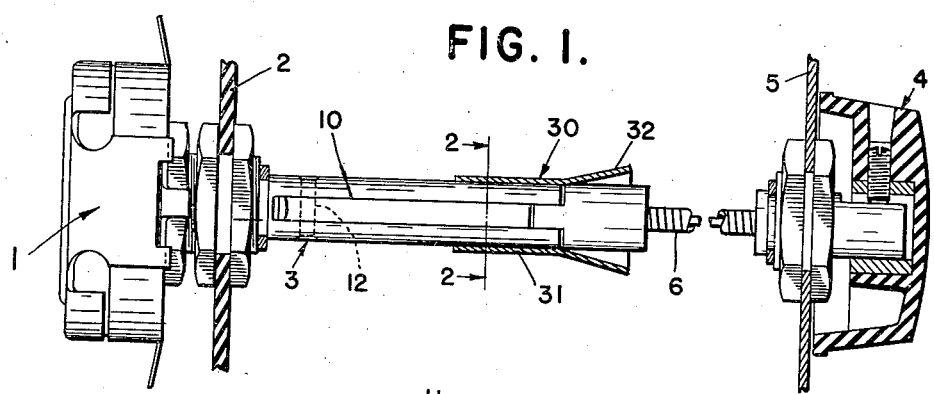
FIG. 1.
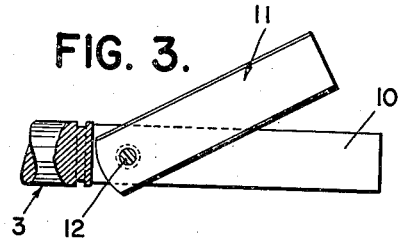
FIG. 2. FIG. 3. FIG. 4.
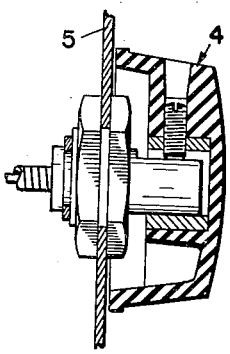
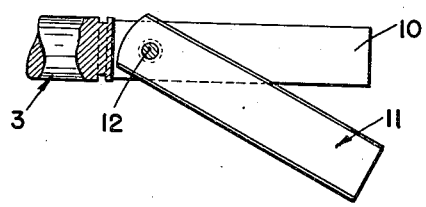
FIG. 5. FIG. 6.
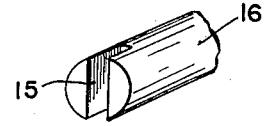
FIG. 13.
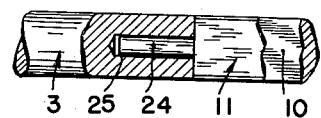
FIG. 8. FIG. 7.
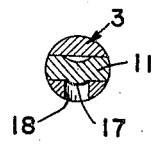 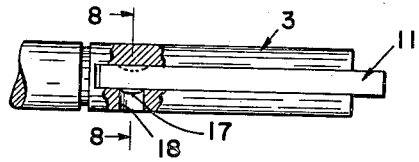
FIG. 14.
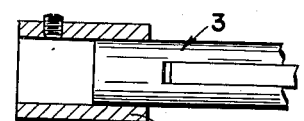
FIG. 10. FIG. 9.
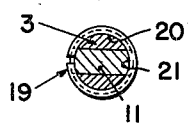 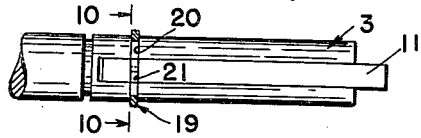
FIG. 12. FIG. 11.
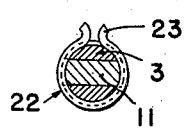
INVENTOR
WM. H. FRITZ
John W. Michael Patented May 9, 1939

2,157,662

UNITED STATES PATENT OFFICE 2,157,662

SHAFT CONSTRUCTION

William H. Fritz, Milwaukee, Wis., assignor to Globe-Union Inc., Milwaukee, Wis., a corporation of Delaware Application July 16, 1938, Serial No. 219,547

10 Claims. (Cl. 64—4)

This invention relates to an improvement in shaft constructions of the type designed to transmit torque to a rotary control device from a knob or other source of power through the medium of a readily detachable slotted or tongue type coupling such as are frequently employed between a flexible and a solid metal shaft.

The device greatly facilitates the replacement of control devices such as a volume or a tone control device or a switch or combinations thereof in radio receivers and makes it practical to provide a shaft of variable length and of a character which may be readily interrelated with a tongue or a slotted socket type of coupling.

Another object of the invention is to provide a device of this character which is extremely simple and durable in construction, reliable and efficient in operation, and readily and easily installed in any variety of types of receivers.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a fragmentary view partly in side elevation and partly in longitudinal vertical section showing one shaft construction embodying the present invention and illustrating it in its operative connection between a control knob and a volume control device;

Figure 2 is a view in cross section taken on line 2—2 of Figure 1;

Figure 3 is a fragmentary view partly in side elevation and partly in longitudinal vertical section showing how the shaft is converted into a socket type of coupling;

Figure 4 is a fragmentary perspective view showing the type of shaft and with which the structure shown in Figure 2 is adapted to cooperate;

Figure 5 is a view similar to Figure 3 but illustrating the structure modified to produce a tongue type of coupling;

Figure 6 is a fragmentary perspective view illustrating the type of shaft and with which the type of structure shown in Figure 5 is adapted to coact;

Figure 7 is a view partly in top plan and partly in horizontal section showing a slight modification in the means for hinging the insert or strip to the slotted shaft;

Figure 8 is a view in cross section taken on line 8—8 of Figure 7;

Figure 9 is a view in side elevation showing how a slight retaining ring may be employed to releasably secure the strip in position in the slot of the shaft;

Figure 10 is a view in cross section taken on line 10—10 of Figure 11;

Figure 11 is a view similar to Figure 9 but showing how a retaining spring may be employed for releasably securing the strip or insert in place in the slot of the shaft;

Figure 12 is a view in cross section taken on line 12—12 of Figure 11;

Figure 13 is a view partly in longitudinal section and partly in side elevation showing still another means for releasably interconnecting the strip or insert in the shaft; and Figure 14 is a view partly in section and partly in elevation showing a slight modification in the shaft structure.

Referring to the drawing and more particularly to Figure 1, the numeral 1 designates generally a control device which may be a volume control, or a tone control, or a switch, or a combination of such control devices. The control device is supported in the usual way on a chassis or the like designated at 2 and is actuated or operated by a rotatable control shaft 3 which projects from the chassis in the manner shown. The shaft 3 is rotated from some suitable source of power, which may be an operating knob 4 rotatably supported on an instrument or control panel 5 and actuating a flexible shaft 6 which is coupled, usually by means of a tongue and socket coupling, to the shaft 3.

The present invention proposes to facilitate the coupling or connection of the shafts 3 and 6 in various types of radio receivers and this especially where the control device is a replacement unit. For this purpose the present invention provides an elongated slot 10 in the shaft 3. The slot 10 extends longitudinally of the shaft 3 and out through the outer end thereof and preferably is approximately of rectangular cross section. A flat strip 11 is receivable in the slot 10 and is the same width as the slot and its breadth is substantially the same as the diameter of the shaft 3. The trip or insert 11 is of such length that when disposed in the slot 10 its inner end is located adjacent the inner end of the slot whereas its outer end terminates adjacent the outer end of the shaft.

In the construction shown in Figures 1, 3 and 5 the strip 11 has its inner end pivotally interconnected with the shaft adjacent the inner end of the slot and this is effected by means of a pivot pin 12 which passes through alined pivoted openings in the strip 11 and shaft 3 and is headed or otherwise secured against axial displacement from its pivot openings.

This construction permits the strip 11 to be swung out of the slot 10 to allow the service man to saw off or cut away either the outer end of the strip 11 (see Figure 3) or the outer end portions of the shaft 3 (see Figure 5). The structure shown in Figure 3 is adapted to coact with the tongue end 13 of a flexible drive shaft 14, a fragment of which is shown in Figure 4. Similarly the structure shown in Figure 5 is designed to be coupled with the slotted end 15 of a flexible shaft 16 shown in Figure 6.

Figures 7 to 13 inclusive illustrate modified or different ways of shiftably interconnecting the insert or strip 11 with the shaft 3.

In Figures 7 and 8 the inner end of the strip 11 is pivotally interconnected with the shaft as before but this is effected by punching out a slight pivot boss 17 on the strip and interfitting it with a transverse recess or socket 18 provided in one of the slotted sections of the shaft 3. The resiliency of the shaft permits of the assembly of this structure.

In the form of the invention shown in Figure 9 the strip 11 is simply fitted in the shaft 3 and is retained in position by means of a retaining ring 19 which is resilient and split and snapped into peripheral grooves 20 and 21 provided in the shaft 3 and insert 11 respectively.

Figures 11 and 12 illustrate a slight variation of the structure shown in Figures 9 and 10 in that a formed retaining spring 22 replaces the split ring 19, the retaining spring 22 having extensions 23 to facilitate its application and removal.

In the form of the invention shown in Figure 13 the inner end of the insert or strip 11 is provided with a pin 24 which projects into and is frictionally interfitted with a socket 25 provided in the shaft 3 and opening into the inner end of the slot 10, the socket being coaxial with the shaft. Friction alone may be relied on with this construction, or some suitable releasable retaining means may be provided.

Figure 14 illustrates the shaft 3 as a separate structure which is provided at one end with a coupling collar 26 designed to be releasably secured to the shaft of the control device. In other respects the shaft 3 may be constructed as previously described.

With a construction of this sort the coupling of a slotted or tongued end of the flexible shaft to the operating shaft of a control device is greatly facilitated. The flexible shaft is under some compression and when its tongue or socket is interfitted with the correspondingly formed formation of the shaft of the control device its inherent resiliency tends to retain it in position. The coupling between the flexible shaft and the operating shafts is maintained by means of a guide funnel designated generally at 30. The guide funnel 30 has a cylindrical or sleeve portion 31 which is frictionally fitted over the outer end of the shaft 3 and strip 11 so as to retain the strip coaxial with the shaft 3. The flaring end 32 of the guide funnel projects beyond the outer end of the shaft 3 and strip 11 and facilitates the interconnection of the shafts and also maintains the coupling.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A device of the character described comprising a shaft having a longitudinal slot extending out through one end thereof, and a strip receivable in said slot and having its inner end pivotally interconnected with the shaft adjacent the inner end of the slot, the outer end of the strip terminating adjacent the outer end of the shaft whereby the outer end portions of the shaft and strip may be selectively cut away to provide a tongue or socket coupling formation.

2. A device of the character described comprising a shaft having a longitudinal slot extending out through one end thereof, a strip receivable in said slot and having its inner end pivotally interconnected with the shaft adjacent the inner end of the slot, the outer end of the strip terminating adjacent the outer end of the shaft whereby the outer end portions of the shaft and strip may be selectively cut away to provide a tongue or socket coupling formation, and a guide funnel having a sleeve portion slidably and frictionally interfitted with the outer end portion of the shaft to maintain said strip in coaxial relation to the shaft and to aid in the coupling of said formation.

3. A device of the character described comprising a round shaft having a longitudinal slot extending out through one end thereof, a flat strip fitted in and filling said slot and having its inner end pivotally interconnected with the shaft adjacent the inner end of the slot, the outer end of the strip terminating adjacent the outer end of the shaft whereby the outer end portions of the shaft and strip may be selectively cut away to provide a tongue or socket coupling formation, and a guide funnel having a sleeve portion fitted on the outer end of the shaft to maintain said strip in coaxial relation to the shaft, in combination with a cooperable shaft having an end portion retained in said guide funnel and fashioned for driving interengagement with the coupling formation on the outer end of the shaft and strip.

4. A device of the character described comprising a shaft having a longitudinal slot extending out through one end of the shaft, a strip receivable in the slot, means interconnecting the inner end of the strip with the shaft adjacent the inner end of the slot and providing for shifting of at least the outer end portion of the strip into and out of the slot, the outer end of the strip terminating adjacent the outer end of the shaft when disposed therein, whereby the outer end portions of the shaft and strip may be selectively cut away to provide a tongue or a socket coupling formation, means for releasably retaining the strip in coaxial relation to the shaft, and a cooperable shaft having an end portion provided with a coupling formation corresponding to that of the outer end portion of the shaft and strip and in driving engagement therewith.

5. A device of the character described comprising a shaft having a slot extending out through one end thereof, an insert having its inner end portion pivotally connected with the shaft adjacent the inner end of the slot, the outer end of the insert terminating adjacent the outer end of the shaft whereby the shaft and insert may be selectively cut away to provide a tongue or socket formation at the outer end thereof, and releasable means for retaining the insert in coaxial relation to the shaft.

6. A device of the character described comprising a round shaft having a slot extending longitudinally and out through one end thereof, a strip received in said slot, means interconnecting the strip and the slot, whereby the strip may be disposed in coaxial relation to the shaft or may be displaced from the slot so as to provide for selectively cutting away of the outer end portion of the shaft or strip and hence the formation of a tongue or a socket coupling at the outer end of the shaft.

7. A device of the character described comprising a shaft having a longitudinal slot extending out through one end thereof, a flat strip fitted in said slot and having its inner end shiftably interconnected to the shaft adjacent the inner end of the slot, the outer end of the strip terminating adjacent the outer end of the shaft whereby the outer end portions of the shaft and strip may be selectively cut away to provide a tongue or a socket coupling formation and releasable means for retaining the strip in coaxial relation to the shaft.

8. A device of the character described comprising an elongated shaft having a longitudinal slot extending out through one end of the shaft, a flat strip fitted in said slot and having its inner end pivotally connected to the shaft adjacent the inner end of the slot, the outer end of the strip terminating adjacent the outer end of the shaft whereby the outer end portions of the shaft and strip may be selectively cut away to provide a tongue or a socket coupling formation, and a guide funnel slidably fitted over the outer end portion of the shaft to retain the strip and shaft in coaxial relation and aid in the coupling of another shaft thereto.

9. A device of the character described comprising a shaft having an elongated slot extending longitudinally and out through one end thereof, a flat strip received in said slot, means interconnecting the inner end of the strip and the slot, whereby the strip may be disposed in coaxial relation to the shaft or may be displaced from the slot so as to provide for selectively cutting away of the outer end portion of the shaft or strip and hence provide for a tongue or a socket coupling formation at the outer end of the shaft, a guide funnel having a sleeve portion frictionally interfitted with and encircling the outer end of the shaft and strip to retain the strip in coaxial relation to the shaft and having a flaring portion projecting beyond the end of the shaft, and a flexible shaft having a portion disposed in the flaring portion of the guide funnel and the end thereof provided with a coupling formation corresponding to and interfitted with the coupling formation at the outer end of the said drive shaft.

10. A device of the character described comprising a shaft having an elongated longitudinal slot extending out through one end thereof, a strip fitted in said slot and terminating at its end at the ends of the slot, said strip and slot having registering peripheral grooves adjacent the inner end of the strip, a spring retaining ring snapped into engagement with said grooves to releasably retain the strip in the slot, the outer end portions of the shaft and strip being adapted to be selectively cut away to provide a tongue or a socket coupling formation at said outer end portion.

WILLIAM H. FRITZ.